(12) United States Patent
Rojas-Cessa et al.

(10) Patent No.: US 9,501,093 B2
(45) Date of Patent: Nov. 22, 2016

(54) MEASUREMENT OF CLOCK SKEW BETWEEN TWO REMOTE HOSTS CONNECTED THROUGH COMPUTER NETWORKS

(71) Applicant: New Jersey Institute of Technology, Newark, NJ (US)

(72) Inventors: Roberto Rojas-Cessa, Brooklyn, NY (US); Khondaker M. Salehin, Passaic, NJ (US)

(73) Assignee: NEW JERSEY INSTITUTE OF TECHNOLOGY, Newark, NJ (US)

( * ) Notice: Subject to any disclaimer, the term of this patent is extended or adjusted under 35 U.S.C. 154(b) by 456 days.

(21) Appl. No.: 13/981,080

(22) PCT Filed: Nov. 19, 2012

(86) PCT No.: PCT/US2012/065902
§ 371 (c)(1),
(2) Date: Jul. 22, 2013

(87) PCT Pub. No.: WO2013/158149
PCT Pub. Date: Oct. 24, 2013

(65) Prior Publication Data
US 2014/0122742 A1 May 1, 2014

Related U.S. Application Data

(60) Provisional application No. 61/636,267, filed on Apr. 20, 2012.

(51) Int. Cl.
*G06F 15/16* (2006.01)
*H04J 3/06* (2006.01)
(Continued)

(52) U.S. Cl.
CPC ............. *G06F 1/14* (2013.01); *H04J 3/0658* (2013.01); *H04L 43/0858* (2013.01); *H04L 43/10* (2013.01)

(58) Field of Classification Search
CPC ... H04L 43/10; H04L 43/087; H04L 43/106; H04L 43/0858; H04L 43/2854; H04J 3/0667; H04J 3/0658
USPC .......... 709/248, 217, 227–229; 370/207–519
See application file for complete search history.

(56) References Cited

U.S. PATENT DOCUMENTS 6,430,160 B1 * 8/2002 Smith ................... H04L 1/242
370/231
6,647,506 B1 11/2003 Yang et al.
(Continued)

OTHER PUBLICATIONS

International Preliminary Report on Patentability for PCT/US2012/065902 filed Nov. 19, 2012, mailed on Oct. 30, 2014, issued Oct. 21, 2014.
(Continued)

*Primary Examiner* — Farzana Huq
(74) *Attorney, Agent, or Firm* — Turk IP Law, LLC

(57) ABSTRACT

Technologies are generally described for measuring clock skew between two remote hosts connected through a computer network. According to some examples, pairs of probe packets, also referred to as a compound probe, may be transmitted over an end-to-end path in both directions (forward and reverse paths) to measure a gap value at the end nodes for clock skew estimation. Compound probes may arrive at the end nodes with a zero dispersion gap (no separation) and the gap values along the forward and reverse paths may be determined by a capacity of the links connected to the end nodes added to the clock speeds of the measuring nodes upon arriving at the end nodes. The link capacity is a constant network parameter. Thus, the ratio of the measured gap values may provide an estimate of clock speed discrepancy between the end nodes.

17 Claims, 8 Drawing Sheets

(51) Int. Cl.
H04J 3/07 (2006.01)
G06F 1/14 (2006.01)
H04L 12/26 (2006.01)

(56) References Cited

U.S. PATENT DOCUMENTS

| | | | | |
|---|---|---|---|---|
| 6,661,810 | B1* | 12/2003 | Skelly | H04J 3/0682 370/516 |
| 6,975,656 | B1* | 12/2005 | Madhavapeddi ... | H04L 12/2854 370/508 |
| 7,051,246 | B2* | 5/2006 | Benesty | H04J 3/0664 714/25 |
| 2002/0188881 | A1* | 12/2002 | Liu | G06F 1/10 713/401 |
| 2008/0259813 | A1* | 10/2008 | Matta | H04L 12/2602 370/252 |
| 2010/0185781 | A1* | 7/2010 | Anderson | G06F 15/16 709/248 |
| 2015/0110102 | A1* | 4/2015 | Ranasinghe | H04J 3/0667 370/350 |

OTHER PUBLICATIONS

International Search Report and Written Opinion for PCT/US12/65902, filed Nov. 19. 2012, mailed on Apr. 11, 2013.
Tsuru et al., "Estimation of clock offset from one-way delay measurement on asymmetric paths", Applications and the Internet (SAINT) Workshops, Feb. 2002.
Salehin et al., "Scheme to measure relative clock skew of two internet hosts based on end-link capacity", Electronics Letters. vol. 48, No. 20, pp. 1282-1284, Sep. 2012.
"Network Time Protocol"; http://en.wikipedia.org/wiki/Network_Time_Protocol, Wikipedia, created Dec. 2002.
"Clock Skew"; http://en.wikipedia.org/wiki/Clock_skew, Wikipedia, created May 2005.
Dropping, Addressing network time protocol synchronization for IPTV, IMS and Femtocells, EE Design Times, Feb. 2, 2012.
Salehin et al., "Scheme to Measure Relative Clock skew using Probe-Gap Measurement over an End-to-End Path", Nov. 28, 2012.
"Remote for Advanced Internet Architectures"; http://caia.swin.edu.au/cv/szander/cprobe/skew_probing.html, Jul. 2008.
Paxson, "On Calibrating Measurements of Packet Transit Times", in proc. SIGMETRICS, Jun. 1998.
Cessa et al., "Scheme to Measure Relative Clock-skew using Probe-gap Measurement over Multiple-hop Network Path", Sep. 2012.
Mills, "Internet time synchronization: The network time protocol", IEEE Transactions on Communications, 39(10), pp. 1482-1493, Oct. 1991.
Moon et al., "Estimation and removal of clock skew from network delay measurements", in proc. IEEE INFOCOM, Mar. 1999.
Zhang et al., "Clock synchronization algorithms for network measurements", in proc. IEEE INFOCOM, Jun. 2002.
Hu et al., "Evaluation and characterization of available bandwidth probing techniques", IEEE JSAC Special Issue in Internet and WWW Measurement, Mapping, and Modeling, 21(6), pp. 879-864, Aug. 2003.
"Remote Synchronised Clock Skew Probing," SWINBURNE, accessed at http://caia.swin.edu.au/cv/szander/cprobe/skew_probing.html, accessed on Oct. 30, 2013, pp. 1-3.
Almes, G. et al., "RFC2679—A one-way delay metric for IPPM," Sep. 1999, accessed at http://www.faqs.org/rfcs/rfc2679.html, accessed on Oct. 30, 2013, pp. 1-15.
Hares, S. et al., "RFC1574—Essential Tools for the OSI Internet," Feb. 1994, accessed at http://www.faqs.org/rfcs/rfc1574.html, accessed on Oct. 30, 2013, pp. 1-10.
Gurewitz, O. et al., "One-way delay estimation using network-wide measurements," IEEE Transactions on Networking, vol. 52, Issue 6, Jun. 2006, pp. 2710-2724.
Malkin, G., "RFC1393—Traceroute using an IP option," Jan. 1993, accessed at http://www.faqs.org/rfcs/rfc1393.html, accessed on Oct. 30, 2013, pp. 1-6.
Govindan, R. and Paxson, V., "Estimating router ICMP generation delays," In proceedings of Active and Passive Measurement Workshop(PAM), 2002, pp. 1-8.
Carter, R. and Crovella, M.E., "Measuring bottleneck link speed in packet-switched networks," Performance Evaluation, vol. 27-28, Oct. 1996, pp. 297-318.
Dovrolis, C. et al., "What do packet dispersion techniques measure?," Twentieth Annual Joint Conference of the IEEE Computer and Communications Societies, vol. 2, 2001, pp. 905-914.
Jacobson, V., "Pathchar—A tool to infer characteristics of Internet paths,"MSRI, Apr. 21, 1997, pp. 1-21.
Downey, A., "Using Pathchar to estimate Internet link characteristics," Proceedings of the conference on Applications, technologies, architectures, and protocols for computer communication, Aug. 1999, pp. 241-250.
Jain, M. and Dovrolis, C., "Pathload: A measurement tool for end-to-end available bandwidth," In proceddings of Passive and Active Measurement, Mar. 2002, pp. 14-25.
Melander, B. et al., "A new end-to-end probing and analysis method for estimating bandwidth bottlenecks," IEEE Global Telecommunications Conference, vol. 1, 2000, pp. 415-420.
Strauss, J. et al., "A measurement study of available bandwidth estimation tool," Proceedings of the 3rd ACM SIGCOMM conference on Internet measurement, 2003, pp. 39-44.
Hu, N. et al., "Locating Internet bottlenecks: Algorithms, measurements, and implications," Computer Communication Review, vol. 34, Issue 4, 2004, pp. 41-54.
Anagnostakis, K.G. et al., "cing: Measuring network-internal delays using only existing infrastructure," Twenty-Second Annual Joint Conference of the IEEE Computer and Communications, vol. 3, Mar. 30-Apr. 3, 2003, pp. 2112-2121.
Salehin,K.M. and Rojas-Cessa, E., "A Combined Methodology for Measurement of Available Bandwidth and Link Capacity in Wired Packet Networks," IET Communications, vol. 4 , Issue 2, Jan. 22, 2010, pp. 240-252.
De Schepper, B. et al., "Constant hardware delay in integrated switching elements with multiserver output queues," IEE Proceedings Communications, vol. 153, Issue 5, Oct. 2006, pp. 664-670.
Papagiannaki, K. et al., "Measurement and analysis of single-hop delay on an IP backbone network," IEEE Journal on Selected Areas in Communications, vol. 21, Issue 6, 2003, pp. 908-921.
"The Network Simulator—ns-2," accessed at http://www.isi.edu/nsnam/ns/, accessed on Oct. 29, 2013, pp. 1-2.
Paxson, V., "End-to-end Internet packet dynamics," IEEE/ACM Transactions on Networking, vol. 7, Issue 3, Jun. 1999, pp. 277-292.
K. Harfoush et al., "Measuring capacity bandwidth of targeted path segments," IEEE/ACM Transactions on Networking, No. 1, pp. 80-92, Feb. 2009.
K. Salehin and R. Rojas Cessa, "Active scheme to measure throughput of wireless access link in hybrid wired-wireless network," IEEE Wireless Communications Letters, vol. 1, No. 6, pp. 645-648, Dec. 2012.
S. Zander and S. J. Murdoch, "An improved clock-skew measurement technique for revealing hidden services," in Proc. of 17th USENIX Security Symposium, CA, USA, pp. 211-225, Aug. 2008.
Almes et al. "A round-trip delay metric for IPPM. " 19 pp Network Working Group, Sep. 1999 Available: http://www.ietf.org/rfc/rfc2681.txt.
Salehin and Rojas-Cessa, "Measurement of Packet Processing Time of an Internet Host using Asynchronous Packet Capture at the Data-Link Layer," Proc. of IEEE International Conference on Communications, Budapest, Hungary, pp. 1-5, Jun. 2013.
Salehin and Rojas-Cessa, "Packet-pair sizing for controlling packet dispersion on wired heterogeneous networks," in Proceedings of IEEE International Conference on Computing, Networking and Communication, Network Algorithm and Performance Evaluation Symposium CA, pp. 1-5, Jan. 2013.
K. Salehin, and R. Rojas-Cessa, "Schemes to Measure Available Bandwidth and Link Capacity with Ternary Search and Compound

(56) References Cited

OTHER PUBLICATIONS

Probe for Packet Networks," in Proc.of IEEE Workshop on Local and Metropolitan Area Networks, NJ, USA, pp. 1-5, May 2010.
K. Salehin, and R. Rojas-Cessa, "Ternary Search Based Scheme to Measure Link Available Bandwidth in Wired Netowrks," in Proc. of IEEE Global Communications Conference, FL, USA, pp. 1-5, Dec. 2010.
K. Salehin, R. Rojas-Cessa, C. Lin, Z. Dong, and T. Kijkanjanarat, "Scheme to Measure Packet Processing Time of a Remote Host through Estimation of End-Link Capacity," major revision, submitted to IEEE Transactions on Computers.
R. Rojas-Cessa, K. Salehin, and K. Egoh "Experimental Performance Evaluation of a Virtual Software Router," in Proc. of IEEE Workshop on Local and Metropolitan Area Networks, NC, USA, pp. 1-2, Oct. 2011 (Poster).
M. Garetto and D. Towsley, "Modeling, simulation and measurements of queuing delay under long-tail Internet traffic," in Proc. of ACM Special Interest Group on Measurement and Evaluation Conference, CA, USA, pp. 1-11, Jun. 2003.
N. McKeown. High performance routers—Talk at IEE, London UK. Oct. 18th, 2001.[Online]. Available: http://tiny-tera.stanford.edu/•nickm/talks/index.html.
R. Prasad, M. Jain, and C. Dovrolis, "Effects of interrupt coalescence on network measurements," in Proc. of Passive and Active Measruement Conference, France, pp. 247-256, Apr. 2004.
R. Rojas-Cessa, K. Salehin, and K. Egoh "Experimental Performance Evaluation of a Virtual Software Router," in Proc. of IEEE Sarnoff Symposium, NJ, USA, pp. 1-5, May 2012.
S. Savage. "IP router design." Feb. 2005 [Online]. Available: http://cseweb.ucsd.edu/classes/wi05/cse123a/Lec8.pdf.
Salehin, K., "PhD Dissertation Defense: End-to-End Network Measurement for Wired and Wireless Networks", Apr. 29, 2103, available at http://ece.njit.edu/news/seminars/spring2013/13_4_29_Salehin.pdf, 2 pages.
J. Sommers and P. Barford, "An active measurement system for shared environments," in Proc. of Internet Measurement Conference, pp. 303-314, (Oct. 2007).
Center for Applied Internet Data Analysis (CAIDA). "Packet size distribution comparison between Internet links in 1998 and 2008." 2 pp (Jun. 2010). Available: http://www.caida.org/research/traffic-analysis/pkt size distribution/graphs.xml.
Sinha et al., "Internet packet size distributions: Some observations," USC/Information Sciences Institute, Tech. Rep. ISI-TR-2007-643, pp. 1-7 (May 2007). Available: http://www.isi.edu/•johnh/PAPERS/Sinha07a.html.
Lee et al. "Not all microseconds are equal: Fine-grained per-flow measurements with reference latency interpolation," in Proc. of ACM Special Interest Group on Data Communication Conference, Delhi, India, pp. 27-38, (Sep. 2010).
Martin, Richard with Elena Malykhina. "Wall street's quest to process data at the speed of light." [Online]. 10 pp, (Apr. 20, 2007) Available: http://www.informationweek.com/news/199200297?pgno=1.
Padmanabhan and Subramanian, "An investigation of geographic mapping techniques for Internet hosts," in Proc. of ACM Special Interest Group on Data Communication Conference, CA, USA, pp. 173-185, (Aug. 2001).
Katz-Bassett et al., "Towards IP geolocation using delay and topology measurements," in Proc. of Internet Measurement Conference, NY, USA, pp. 71-84 (Oct. 2006).
Gueye et al. "Constraint-based geolocation of Internet hosts," IEEE/ACM Transactions on Networking, vol. 14, No. 6, pp. 1219-1232, Taormina, Italy, (Oct. 2006).
Dong et al. "Network measurement based modeling and optimization for IP geolocation," Computer Networks, vol. 56, No. 1, pp. 85-98, (Sep. 2011).
Leinen, Simon, "What flows in a reserach and education network?" SWITCH [Online]. Seoul, South Korea, (Apr. 2009), 13 pp. Available: http://pam2009.kaist.ac.kr/presentation/switch-flows.pdf.
Paxson, Vern, "Measurements and analysis of end-to-end Internet dynamics," Ph.D. dissertation, University of California, Berkeley, Stanford, California, 409 pp, (Apr. 1997).
Dovrolis et al., "Packet dispersion techniques and capacity estimation," IEEE/ACM Transactions on Networking, vol. 12, No. 6, pp. 963-977, (Dec. 2004).
Salehin and Rojas-Cessa, "A combined methodology for measurement of available bandwidth and link capacity in wired packet networks," IET Communications,vol. 4, No. 2, pp. 240-252, (Jul. 2009).
"Endace DAG 7.5G2 datasheet". 2 pp, (Mar. 2013) Available: http://www.endace.com/assets/files/resources/ENDDatasheet\DAG7.5G2 3.0.pdf.
Mills et al. "RFC 1305—Network time protocol version4: Protocol and algorithms specification." 111pp. (Mar. 1992) Available: http://www.ietf.org/rfc/rfc5905.txt.
Vito et al., "One-way delay measurement: State of art,"IEEE Transactions on Instrumentation and Measurements, vol. 57, No. 12, pp. 2742-2750, (Dec. 2008).
P. Willman et al. "An efficient programmable 10 gigabit ethernet network interface card," in Proc. of IEEE International Symposium on High-Performance Computer Architecture, CA, USA, pp. 96-107, (Nov. 2005).
Bi et al. "On estimating clock skew for one-way measurement," Computer Communications, vol. 29, No. 8, Abstract, 1 page, (May 2006).
K. Ramakrishnan, "Performance considerations in designing network interfaces," IEEE Journal on Selected Areas in Communications, vol. 11, No. 2, pp. 203-219, (Feb. 1993).
Mandeville and Perser, "RFC 2889—Benchmarking methodology for LAN switching devices." CQOS Inc. Spirent COmmunications, 33 pp. (Aug. 2000). Available: http://www.ietf.org/rfc/rfc2889.txt.
Angrisani et al., "Measurement of processing and queuing delays introduced by an open-source router in a single-hop network," IEEE Transations on Instrumentation and Measurement, vol. 55, No. 4, pp. 1065-1076, (Aug. 2006).
K. Lai and M. Baker, "Measuring link bandwidths using a deterministic model of packet delay," in Proc. of ACM Special Interest Group on Data Communication Conference, Stockholm, Sweden, pp. 283-294, (Sep. 2000).
K. Salehin and R. Rojas-Cessa, "Scheme to measure relative clock skew of two Internet hosts based on end-link capacity," IET Electronics Letters, vol. 48, No. 20, pp. 1282-1284, (Sep. 2012).
Harfoush et al, "Measuring bottleneck bandwidth of targeted path segments," in Proc. of IEEE International Conference on Computer Communications, CA, USA, pp. 2079-2089, (Oct. 2003).
Spirent Communications, "Highest port density performance analysis system: SmartBits 6000C." Specification, (2004) Available:http://www.spirent.com/•/media/Datasheets/Broadband/ObsoleteSMBTM/SmartBits%206000C.pdf.
Y. Ghiassi-Farrokhfal and J. Liebeherr, "Output characterization of constant bit rate traffic in FIFO networks," IEEE Communications Letters, vol. 13, No. 8, pp. 618-620, (Aug. 2009).
C. Choon. High speed networks and multimedia networking. 13 pp, (Aug. 2005) Available: http://www.comp.nus.edu.sg/•cs5224/lectures/traf fic.pdf.
[K. Lai, "Measuring bandwidth," in Proc. of IEEE International Conference on Computer Communications, NY, USA, pp. 235-245, (Mar. 1999).
Kapoor et al., "CapProbe: A simple and accurate capacity estimation technique," in Proc. of ACM Special Interest Group on Data Communication Conference, OR, USA, pp. 67-78, Portland, OR (Sep. 2004).
B. Mah. "pchar: A tool for measuring Internet path characteristics." Kitchenlab, 2 pp. (Feb. 2005) . Available:http://www.kitchenlab.org/www/bmah/Software/pchar/.
Jin et al., "Network characterization service (NCS)." Berkeley, CA. 11 pp, (Dec. 2011) Available: http://web.archive.org/web/20111229041049/http://www-didc.lbl.gov/NCS/.
J. Postel. "RFC 792—Internet Control Message Protocol." 21 pp. (Sep. 1981). Available: http://tools.ietf.org/html/rfc792.

(56) References Cited

OTHER PUBLICATIONS

Qin et al, "Task-execution scheduling schemes for network measurement and monitoring," Computer Communications, vol. 33, No. 2, pp. 124-135, (Feb. 2010).
J. Bolot, "Characterizing end-to-end packet delay and loss in the Internet," Journal of High-Speed Networks, vol. 2, No. 3, pp. 305-323, (Dec. 1993).
B. Ngamwongwattana and R. Thompson, "Sync & Sense: Voip measurement methodology for assessing one-way delay without clock synchronization," IEEE Transactions on Instrumentation and Mesurement, vol. 59, No. 5, pp. 1318-1326, (May 2010).
Lakshminarayanan et al., "Bandwidth estimation in broadband access networks," in Proc. of Internet Measurement Conference, Sicily, Italy, pp. 314-321, (Oct. 2004).
Angrisani et al., "Modeling and measuring the capacity of communication networks," IEEE Transactions on Instrumentation and Measurement, vol. 59, No. 5, pp. 1065-1072, (May 2010).
Li et al., "Wbest: A bandwidth estimation tool for IEEE 802.11 wireless networks," in Proc. of IEEE Conference on Local Computer Networks (LCN), Que., Canada, pp. 374-381, (Oct. 2008).
Shah et al., "Available bandwidth estimation in ieee 802.11-based wireless networks," in Proc. of First ISMA Workshop on Bandwidth Estimation,CA, USA, p. 1-3, (Dec. 2003).
Vassis et al., "The IEEE 802.11g standard for high data rate wlans," IEEE Network, vol. 19, No. 3, pp. 21-26, May 2005.

Belkin Corporation, "Belkin wireless cable/dsl gateway router." User Manual, (2002) Available: http://www.belkin.com/support/dl/f5d6231-4v2-%20manual.pdf.
"Iperf." 1 page Sourceforge, [Online]. Available: http://iperf.sourceforge.net/. (Mar. 2008).
M. Gast. "When is 54 not equal to 54? a look at 802.11a, b, and g throughput." (Aug. 2008) 4 pp. Available: http://www.oreillynet.com/pub/a/wireless/2003/08/08/wireless throughput.html\?page=2.
Kreibich et al, "Netalyzr: Illuminating the edge network," in Proc. of Internet Measurement Conference, Melbourne, Australia, pp. 246-259, Nov. 2010.
Johnsson et al.,"An analysis of active end-to-end bandwidth measurements in wireless networks," in Proc. of 4th IEEE/IFIP Workshop on End-to-End Monitoring Techinique and Services, BC, Canada, pp. 74-81, (Jul. 2006).
A. Hernandez and E. Magana, "One-way delay measurement and characterization," in Proc. of IEEE International Conference on Networking and Services, Athens, Greece, 6 pp, Jun. 2007.
G. Jin and B. Tierney, "System capability effects on algorithms for network bandwidth measurements," in Proc. of Internet Measurement Conference, FL, USA, pp. 27-38, Oct. 2003.
Csabai et al., "ETOMIC advanced network monitoring system for future internet experimentation," in Proc. of International Conference on Testbeds and Research Infrastructures for the Development of Networks and Communities, Berlin, Germany, pp. 243-254, May 2010.

* cited by examiner

MEASUREMENT OF CLOCK SKEW BETWEEN TWO REMOTE HOSTS CONNECTED THROUGH COMPUTER NETWORKS

CROSS REFERENCE TO RELATED APPLICATIONS

This Application is the National Stage filing under 35 U.S.C. §371 of PCT Application Ser. No. PCT/US2012/65902 filed on Nov. 19, 2012, which claims priority under 35 U.S.C. §119(e) to U.S. Provisional Patent Application Ser. No. 61/636,267 filed on Apr. 20, 2012. The disclosures of the PCT. Application and the U.S. Provisional Application are hereby incorporated by Reference in their entireties.

BACKGROUND

Unless otherwise indicated herein, the materials described in this section are not prior art to the claims in this application and are not admitted to be prior art by inclusion in this section.

To perform fair and timely transactions over host computers remotely located and connected through one or more computer networks, the host typically needs the same reference clock, or synchronized clocks. These clocks may have different time offset, which may be adjusted. However, the host clocks may have different clock skew, which is relatively difficult to measure.

Network Time Protocol (NTP) is a widely used clock synchronization protocol to correct clock information between network nodes. NTP runs on a large distributed network of time servers including different levels of clock accuracy. The time servers may be connected in hierarchical manner, where the most accurate servers are located at the top tier of the NTP network. Nodes connected to the NTP network may synchronize their clocks from a neighbor node whose time information is already adjusted by an upper tier NTP node (e.g., a time server). NTP uses complex data filtering, peer selection, and combining algorithms between the participating nodes in its network for clock synchronization. However, it is not guaranteed that NTP can always eliminate relative clock skew between two nodes even if their clocks are synchronized by a top layer time server.

SUMMARY

The present disclosure generally describes techniques for measuring clock skew between two remote hosts connected through a computer network.

According to some examples, a method for estimating a clock skew between two remotely connected hosts is described. An example method may include transmitting a train of compound probes comprising two or more packets from a source host to a destination host, determining a minimum intra-compound gap of the train of compound probes received at the destination host, transmitting another train of compound probes comprising two or more packets from the destination host to the source host, and determining a minimum intra-compound gap of the other train of compound probes received at the source host. The method may further include computing a difference between the minimum intra-compound gaps and estimating the clock skew at the destination host based on a ratio of the computed difference and the minimum intra-compound gap of the other train of compound probes received at the source host.

According to other examples, a system for estimating a clock skew between two remotely connected hosts may include a first server and a second server. The first server may transmit a train of compound probes comprising two or more packets in a forward path to a second server over the one or more networks, receive a minimum intra-compound gap of the train of compound probes determined at the second server, receive another train of compound probes comprising two or more packets in a reverse path from the second server over the one or more networks, determine a minimum intra-compound gap of the other train of compound probes, compute a difference between the minimum intra-compound gaps, and estimate the clock skew at the second server based on a ratio of the computed difference and the minimum intra-compound gap of the other train of compound probes received at the first server. The second server may transmit the other train of compound probes comprising two or more packets to the first server over the one or more networks.

According to further examples, a computing device for estimating a clock skew between two remotely connected hosts is described, the computing device may include a communication module configured to communicate with a plurality of other computing devices over one or more networks, a memory configured to store instructions, and a processor configured to execute a timing module. The timing module may transmit a train of compound probes comprising two or more packets in a forward path to a destination host over the one or more networks, receive a minimum intra-compound gap of the train of compound probes determined at the destination host, receive another train of compound probes comprising two or more packets in a reverse path from the destination host over the one or more networks, determine a minimum intra-compound gap of the other train of compound probes, compute a difference between the minimum intra-compound gaps, and estimate the clock skew at the destination host based on a ratio of the computed difference and the minimum intra-compound gap of the other train of compound probes received at the computing device.

According to yet other examples, a computer-readable storage medium with instructions stored thereon for estimating a clock skew between two remotely connected hosts is described. The instructions may cause a method to be performed when executed. The method may include transmitting a train of compound probes comprising two or more packets from a source host to a destination host, determining a minimum intra-compound gap of the train of compound probes received at the destination host, transmitting another train of compound probes comprising two or more packets from the destination host to the source host, and determining a minimum intra-compound gap of the other train of compound probes received at the source host. The method may further include computing a difference between the minimum intra-compound gaps and estimating the clock skew at the destination host based on a ratio of the computed difference and the minimum intra-compound gap of the other train of compound probes received at the source host.

According to some examples, a method for estimating a clock skew between two remotely connected hosts may include transmitting a train of compound probes comprising two or more packets from a source host to a destination host, receiving a minimum intra-compound gap of the train of compound probes determined at the destination host, receiving another train of compound probes comprising two or more packets from the destination host, determining a minimum intra-compound gap of the other train of compound probes, computing a difference between the minimum intra-compound gaps, and estimating the clock skew at the destination host based on a ratio of the computed difference and the minimum intra-compound gap of the other train of compound probes received at the source host.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
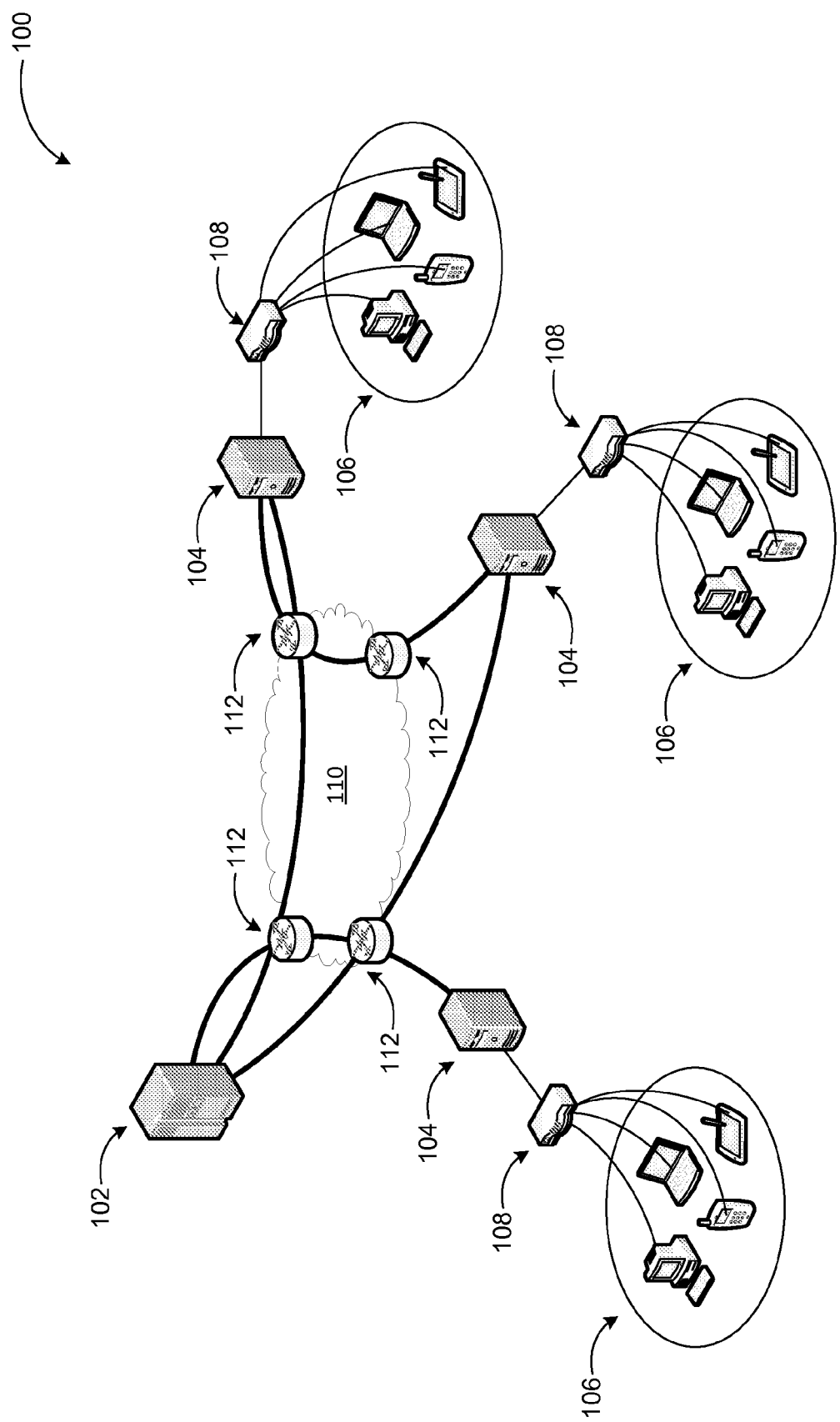
FIG. 1 is a diagram of an illustrative example network communication system, where clock skew between two remote hosts connected through a computer network may be measured.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to measuring clock skew between two remote hosts connected through a computer network.

Briefly stated, technologies are generally described for measuring clock skew between two remote hosts connected through a computer network. According to some examples, pairs of probe packets, also referred to as a compound probe, may be transmitted over an end-to-end path in both directions (forward and reverse paths) to measure a gap value at the end nodes for clock skew estimation. Compound probes may arrive at the end nodes with a zero dispersion gap (no separation) and the gap values along the forward and reverse paths may be determined by a capacity of the links connected to the end nodes added to the clock speeds of the measuring nodes upon arriving at the end nodes. The link capacity is a constant network parameter. Thus, the ratio of the measured gap values may provide an estimate of clock speed discrepancy between the end nodes.

FIG. 1 is a diagram of an illustrative example network communication system, where clock skew between two remote hosts connected through a computer network may be measured, arranged in accordance with at least some embodiments described herein.

Diagram 100 shows a number of different host devices in a networked environment. Network 110 may represent one or more networks including, but not limited to, wired, wireless, public, enterprise, secure, non-secure, networks. A number of host devices such as desktop computers, laptop computers, portable computers, smart phones, and the like, may communicate with other computing devices over the network 110.

In an example configuration, groups of host devices 106 may access the network through one or more specialized devices (e.g., routers 108) and/or servers 104. Switches 112 may direct data packets to their destinations over other switches, servers, and other nodes. In some examples, a centralized control server 102 may manage network operations, redundancies, reliability, etc. by collecting information from servers, client devices, and other devices in the network 110, and by transmitting instructions associated with specific operations. For example, the control server 102 may communicate with host device pairs, cause them to transmit trains of compound probes, and determine clock skew as described herein. In other examples, network management may be distributed over a number of servers.

Clocks provide time information based on the resolution of their oscillating component. A clock resolution (oscillation frequency) is the smallest instance of time that can be measured by a time keeping device in order to record the duration of an event. Accuracy of a clock depends on the stability of its resolution, in other words its constant oscillation frequency. Deviation in clock resolution (clock-speed or oscillation frequency variation) may have the potential to damage precise time measurement of an event over a period of time. Time measurement may also be negatively affected by the resolution difference between two clocks running in different speeds that are involved a measurement.

In wired data network, end-to-end one way delay (OWD) is a parameter for monitoring network performance, which may be measured from a packet's sending time and receiving time instances (e.g., OWD=receiving time−sending time) provided by the clocks at source and destination nodes, respectively. However, if there is relative error (speed discrepancy) between the two different clocks, accurate OWD measurement may be hard to achieve. Even a small clock-speed discrepancy may result in a large clock offset values (difference of time between two clocks at any instance) that may worsen the OWD measurement. Clock-speed discrepancy may occur over time due to various physical phenomena such as temperature or humidity variations. Because clock speeds between two different clocks may not be guaranteed to be same, relative clock-skew measurement may be needed for precise calculation of time duration in the field of network-performance measurement and analysis.

Schemes for measuring relative clock-skew are typically based on OWD measurement, which may be vulnerable to network congestion along a measurement path. OWD based schemes may also be involved with large amounts of probing load in order to eliminate measurement error through rigorous statistical processing of the acquired data set.

A system according to some embodiments may estimate the clock-speed discrepancy (clock skew) of two hosts in a computer network based on probe-gap measurement over a multiple-hop network path using a compound probe. A compound probe is a set of two packets sent back to back, where the sizes of the packets may be engineered. The clock skew may be measured without employing complex and rigorous statistical approaches with a small amount of probing load under high network-congestion condition ensuring measurement robustness. In addition, embodiments may be applied to two hosts connected remotely independent of a distance between the two hosts and of the level of network congestion or network traffic.

Figure 2:
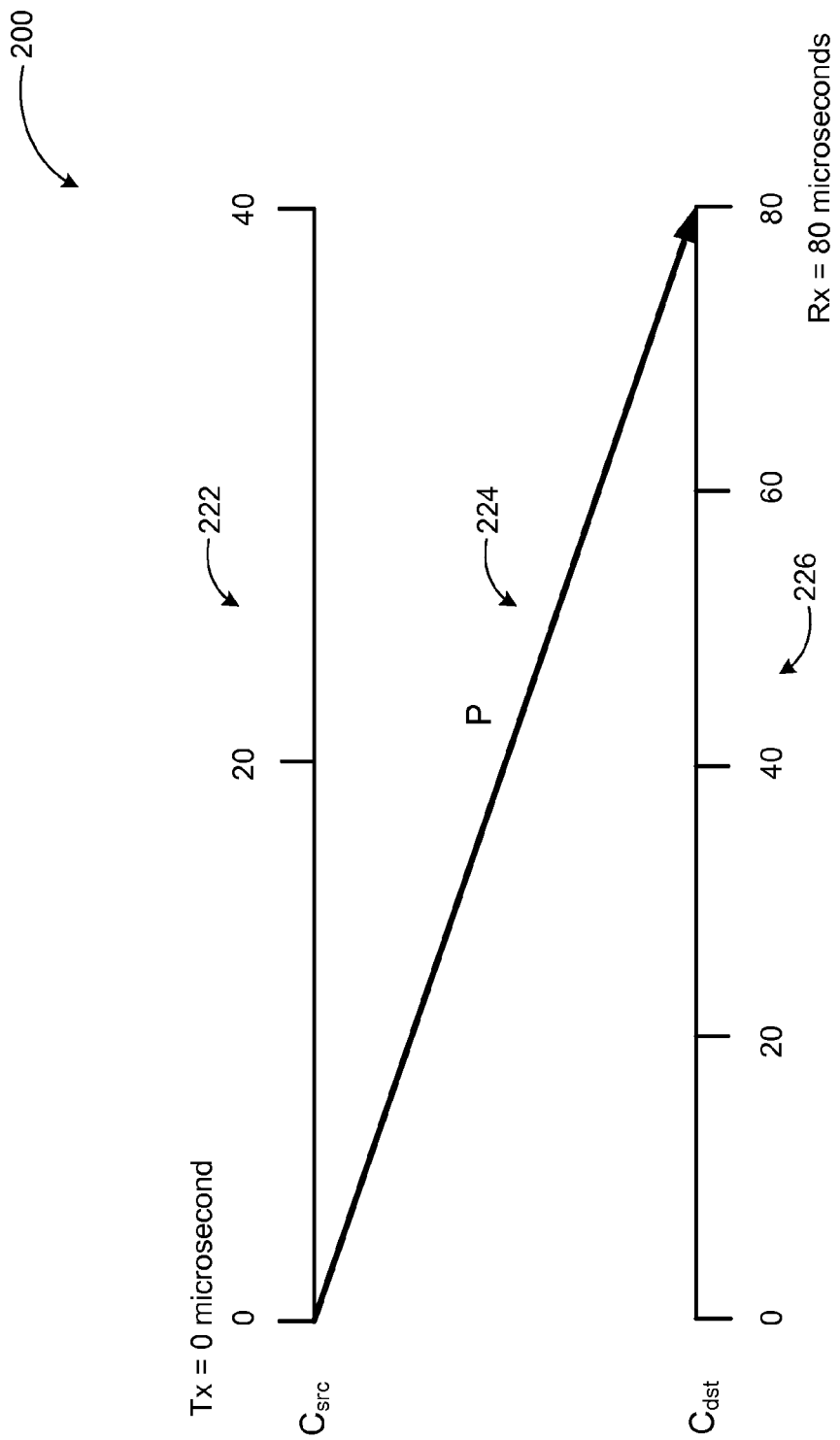
FIG. 2 illustrates an example effect of clock speed discrepancy on end-to-end one way delay (OWD) measurement.

FIG. 2 illustrates an example effect of clock speed discrepancy on end-to-end one way delay (OWD) measurement, arranged in accordance with at least some embodiments described herein.

Diagram 200 shows the effect of clock-speed discrepancy (relative clock-skew) in the measurement using a timing diagram of two different clocks. P 224 is a probe packet that may have been sent by a source node towards a destination node to measure OWD between nodes. $C_{src}$ 222 and $C_{dst}$ 226 denote the local clocks at source and destination nodes, respectively, where $C_{dst}$ is running two times faster than $C_{src}$. According to the local clocks' references, the source node may send P 224 at 0-microsecond and the destination node may receive it at 80 microseconds.

In the illustrated example scenario, the measured OWD is 80 microsecond (OWD=Rx−Tx) even though the actual OWD may be 40 microsecond according to $C_{src}$. Due to clock speed discrepancy between the source and destination nodes, $C_{src}$ advances with two ticks (each tick being equivalent to 20 microseconds) as compared to four ticks in $C_{dst}$ during the course of measurement. Therefore, the measured OWD may inflate from 40 microseconds to 80 microseconds and a clock offset value of 40 microseconds (80 microseconds−40 microseconds=40 microseconds) is added between the $C_{src}$ and $C_{dst}$ by the time of P's arrival at the destination.

Figure 3:
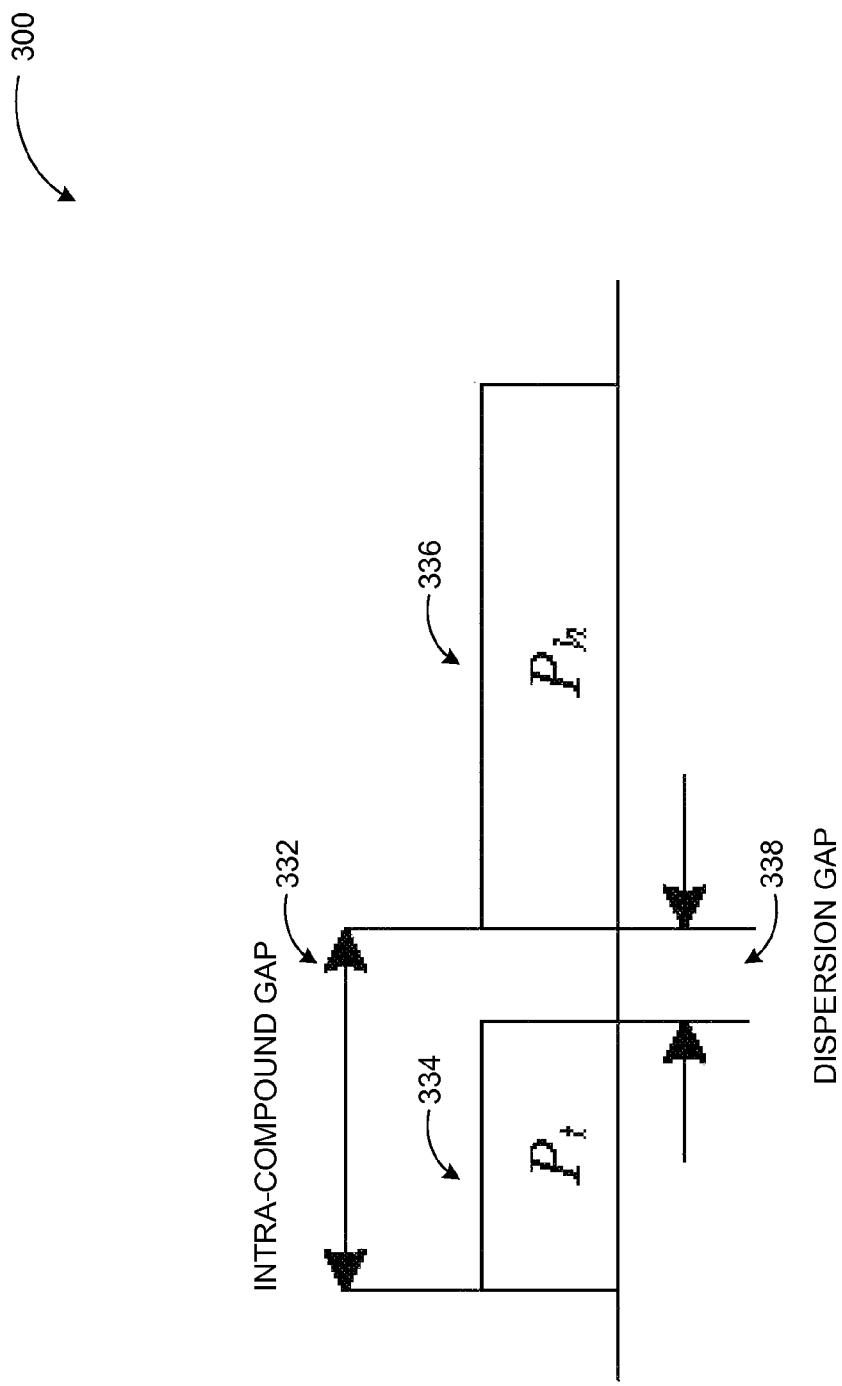
FIG. 3 illustrates an example compound probe structure with an intra-compound gap and a dispersion gap.

FIG. 3 illustrates an example compound probe structure with an intra-compound gap and a dispersion gap, arranged in accordance with at least some embodiments described herein.

Diagram 300 shows a two-packet compound probe used for the measurement of clock skew according to some examples. The compound probe includes a large heading-packet $P_h$ 336 followed by a smaller trailing-packet $P_t$ 334. A gap between the last bits of $P_h$ 336 and $P_t$ 334 is called the intra-compound gap 332, and the gap between the last bit of $P_h$ 336 and first bit of $P_t$ 334 is called the dispersion gap 338 (separation) of the probe structure. The intra-compound gap may also be referred to as intra-probe gap or inter-packet gap.

A system according to example embodiments using a compound probe structure aims to make $P_t$ 334 arrive after $P_h$ 336 with a zero-dispersion gap at the receiving end node over a multiple-hop path. The zero-dispersion gap between $P_h$ 336 and $P_t$ 334 at the end node may force the heading and trailing packets to operate in a joint queuing region (JQR). In JQR state with a zero-dispersion gap, the gap value between a pair of probes may become proportional to the capacity of the link connected to the receiving end node. Otherwise, a compound probe with a non-zero dispersion may have larger intra-compound gap value at the end node and may be easily discarded with statistical analysis.

Figure 4:
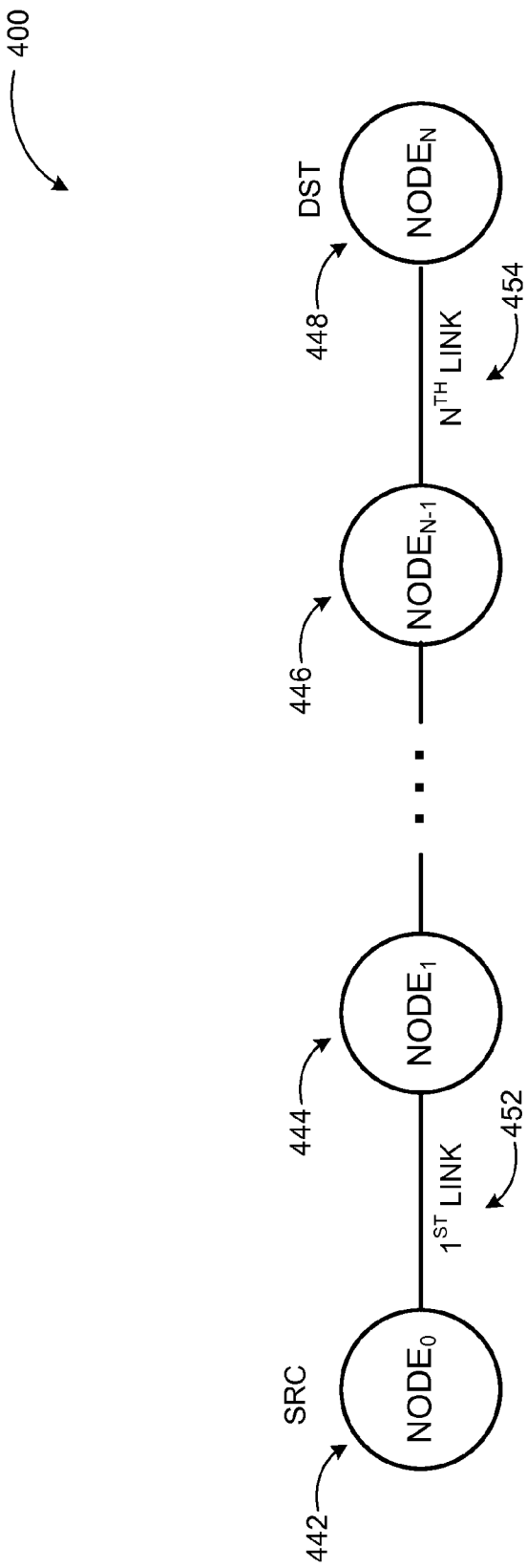
FIG. 4 conceptually illustrates an example multiple hop path in a networked communication system.

FIG. 4 conceptually illustrates an example multiple hop path in a networked communication system, arranged in accordance with at least some embodiments described herein.

Considering the example end-to-end path of n hops shown in diagram 400, the 1st link 452 and n-th link 454 may be connected to the end nodes src 442 and dst 448, respectively, with additional nodes such as node1 444 and node (n−1) 446 in between. An example step-by-step technique to measure clock skew between src 442 and dst 448 nodes over the path may be:

1: Set $s_h$=Path MTU between src and dst
2: Set $s_t=s_b$, where $s_b \leq s_t(max)$ over the forward path (src to dst)
3: Send compound probes with $s_h$ and $s_t$ from src to dst
4: Get the smallest intra-packet gap $G_{min}(s_b)$
5: Set $s_t=s_a$, where $s_a<s_b$
6: Send compound probes with $s_h$ and $s_t$ from src to dst
7: Get the smallest intra-packet gap $G_{min}(s_a)$
8: Estimate the slope of the remote end link $L_n, m'_n=(G_{min}(s_b)-G_{min}(s_a))/(s_b-s_a)$ 9: Determine the expected intra-packet gap for $s_b$ on $L_n$, $E[G(s_b)]=s_b/L_n$
10: Estimate the clock skew of dst, $\beta_{dst}=((m'_n \times s_b)-E[G(s_b)])/E[G(s_b)]$
11: Repeat Steps 2 through 7 over the reverse path (dst to src), where $s_t=s_y$ and $s_x$, respectively, to send compound probes from dst to src for determining $G_{min}(s_y)$ and $G_{min}(s_x)$
12: Estimate the slope of the remote end link $L_1, m'_1=(G_{min}(s_y)-G_{min}(s_x))/(s_y-s_x)$ 13: Determine the expected intra-packet gap for $s_y$ on $L_1$, $E[G(s_y)]=Ss_y/L_1$
14: Estimate the clock skew of src, $\beta_{src}=((m'_1 \times s_y)-E[G(s_y)])/E[G(s_y)]$
15: Calculate the relative clock skew of dst with respect to src $\beta=\beta_{dst}-\beta_{src}$ $s_t$ represents a size of a packet for the compound probe. The computation approach described above is for illustration purposes only and does not constitute a limitation on embodiments. Relative clock skew between a source and a destination host may be determined through other computations methods using the principles described herein.

One of the challenges may be identifying an intra-compound gap value in each probing train that reflects the capacity of the link connected to the measuring end node of the path. To address this challenge, a data-filtering scheme may be introduced in order to eliminate erroneous'intra-compound gaps (disproportionate gaps due to network congestion) from the measurement sample sets to estimate clock skew accurately. Such a data-filtering scheme may iteratively eliminate large gap values from each sample set to identify the smallest intra-compound gap, which corresponds to an intra-compound gap with a zero-dispersion gap. In JQR state with a zero-dispersion gap, the smallest intra-compound gap of a compound probe may represent the capacity of the link connected to the receiving node.

Considering a sample set $S=\{y1, y2, y3, \ldots, yk\}$ of k intra-compound gaps measured at an end node, following technique may filter erroneous (decompressed) intra-compound gaps in S:

1. Compute the mean $\mu$ of the sample set S.
2. Discard data elements in S that are greater than $\mu$.
3. Compute the standard deviation $\sigma$ of the reduced sample set.
4. Iterate the above process starting from Step 1 until one of the following conditions occurs:
    a. $\mu$ is equal to the largest data element of the reduced sample set.
    b. $\sigma$ is equal in two consecutive iterations.
    c. $\sigma$ of the current iteration is larger than that of the previous iteration.

The largest data element is the smallest intra-compound gap of the sample set S upon terminating the data-filtering algorithm.

Figure 5:
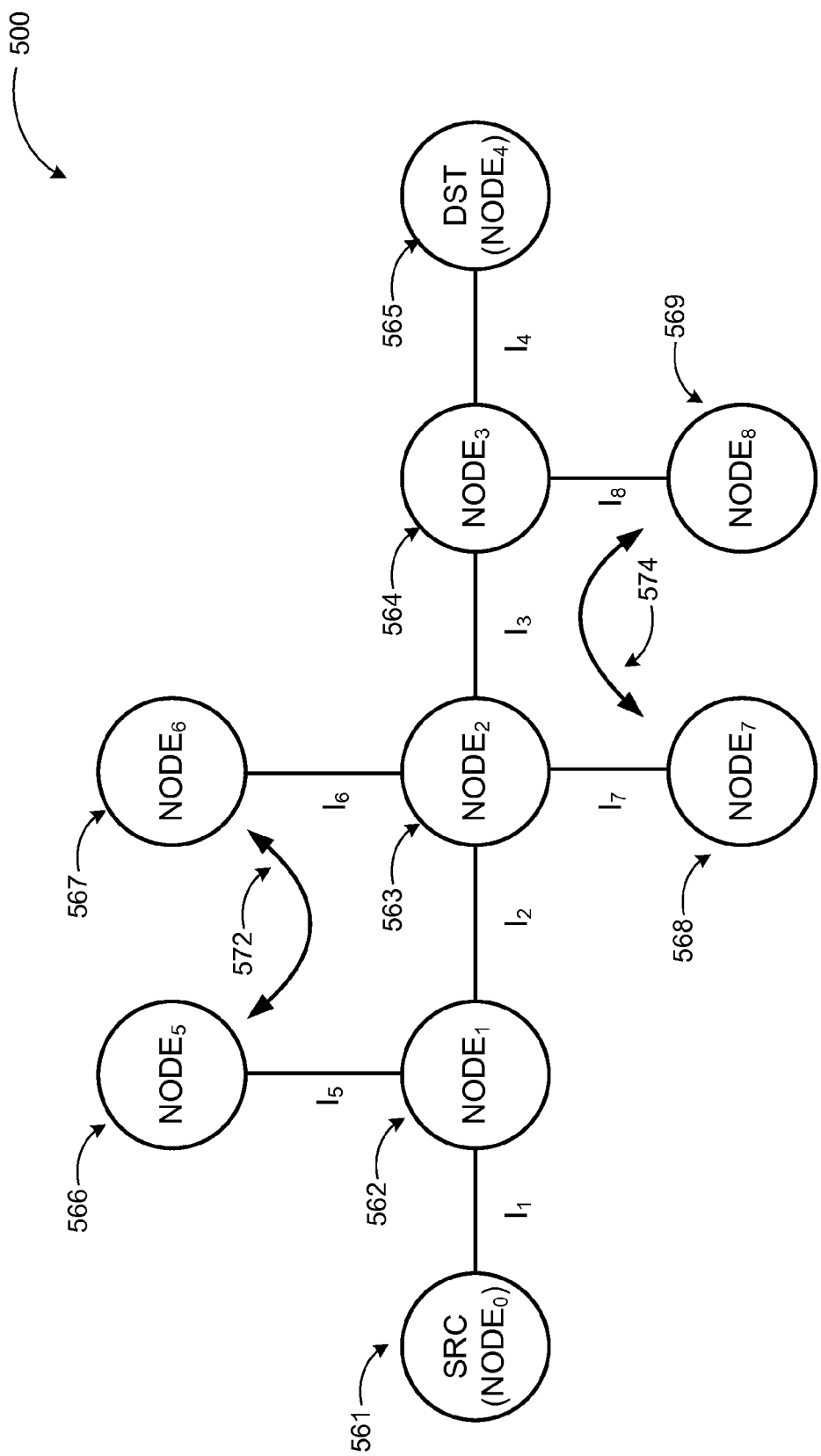
FIG. 5 conceptually illustrates an example multiple hop network path topology that may be used as a basis for some of the comparative clock skew measurement examples discussed herein.

FIG. 5 conceptually illustrates an example multiple hop network path topology that may be used as a basis for some of the comparative clock skew measurement examples discussed herein, arranged in accordance with at least some embodiments described herein.

Diagram 500 shows an example multiple-hop path topology for measuring relative clock skew between source (src) 561 and destination (dst) 565 in a simulated environment. In an example scenario, the dst's clock may be designed to run 0.005 times faster than the src's clock. Both src and dst may send 50 compound probes to each other to measure the intra-compound probe gaps on the last-hop ($l_4$) and first-hop ($l_1$) links, respectively, for estimating clock skew between the source 561 (node0) and destination 565 (node4).

The example topology may include additional nodes directly between the source and the destination such as node1 562, node2 563, and node3 564. In addition, side nodes such as node5 566, node6 567, node7 568, and node8 569 may be on other paths (e.g., links $l_5$, $l_6$, $l_7$, $l_8$, respectively). The side nodes may also have bi-directional communication between them (e.g. 572, 574) without the involvement of the source 561 or destination 565.

The sizes of the heading and the trailing packets used in the compound probe may be, for example, 1500-byte and 100-byte, respectively. One or more of links (e.g., the second-hop ($l_2$) and third-hop ($l_3$)) may be congested with bidirectional cross-traffic loads.

Embodiments may be implemented via combinations of hardware and software components. The software components may include existing or new communication or signaling systems. Moreover, embodiments are not limited to example network systems, but may be implemented in any network system that employs packet-based communications between end hosts.

While embodiments have been discussed above using specific examples, components, scenarios, and configurations in FIG. 1 through FIG. 3, they are intended to provide a general guideline to be used for implementing measurement of clock skew between two remote hosts connected through a computer network. These examples do not constitute a limitation on the embodiments, which may be implements using other components, optimization schemes, and configurations using the principles described herein.

Figure 6:
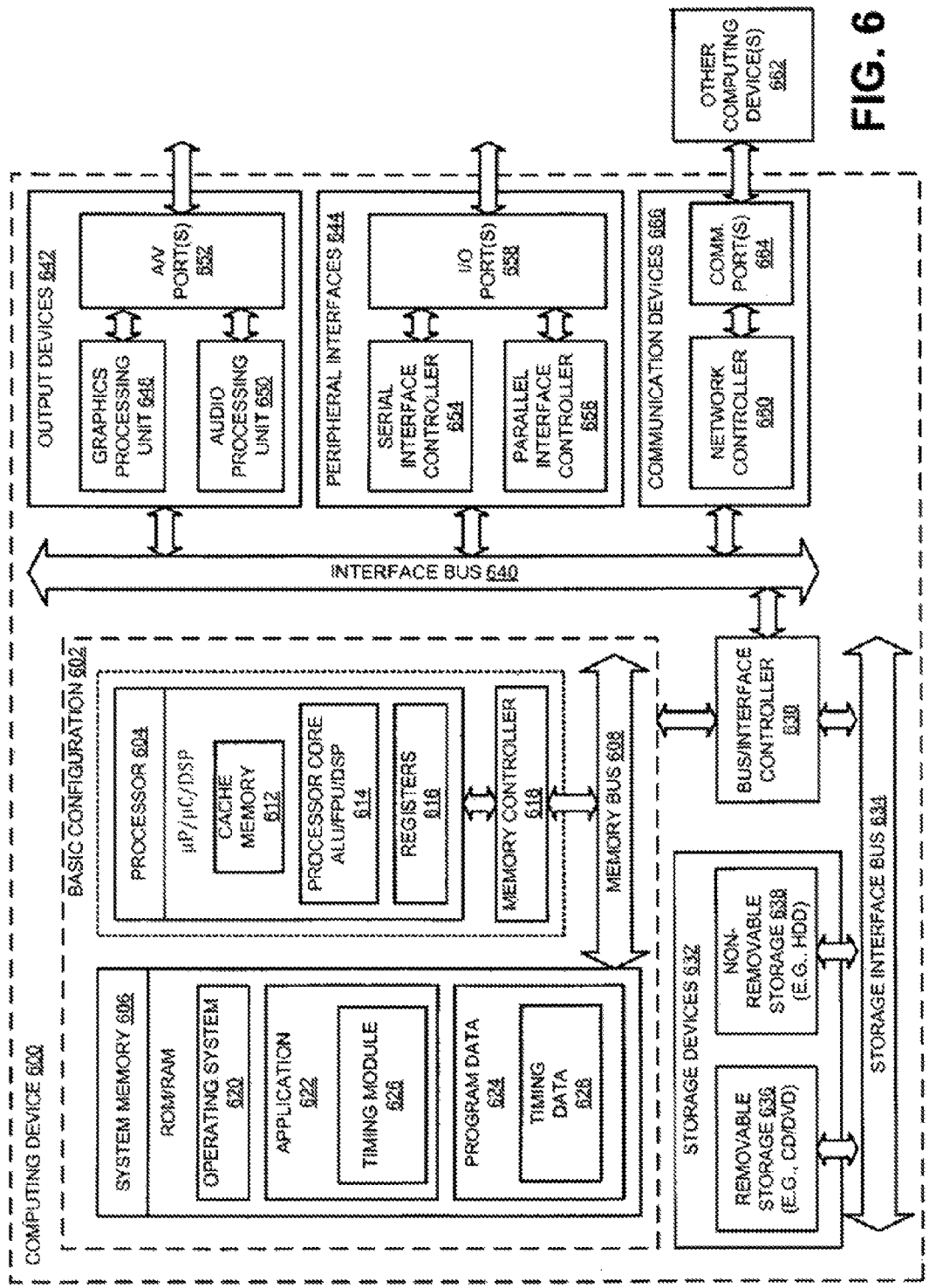
FIG. 6 illustrates a general purpose computing device, which may be used to implement measurement of clock skew between two remote hosts connected through a computer network.

FIG. 6 illustrates a general purpose computing device, which may be used to implement measurement of packet processing time of end hosts through estimation of end-link capacity, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor ($\mu$P), a microcontroller ($\mu$C), a digital signal processor (DSP), or any combination thereof. Processor 604 may include one more levels of caching, such as a cache memory 612, a processor core 614, and registers 616. Example processor core 614 may include an arithmetic logic unit (ALU), a floating point unit (FPU), a digital signal processing core (DSP Core), or any combination thereof. An example memory controller 618 may also be used with processor 604, or in some implementations memory controller 614 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may be a network management application, network testing application, or comparable ones and include a timing module 626 that is arranged to measure clock skew between two remote hosts connected through a computer network. Program data 624 may include one or more of timing data 628 and similar data as discussed above in conjunction with at least FIG. 1 through 3. This data may be useful for measuring clock skew between remotely connected host devices as is described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 666 to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 666 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a, modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a physical server, virtual server, a computing cloud, or a hybrid device that include any of the above functions. Computing device 600 may also be implemented as a personal computer including both laptop computer and non-laptop computer configurations. Moreover computing device 600 may be implemented as a networked system or as part of a general purpose or specialized server.

Networks for a networked system including computing device 600 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 7:
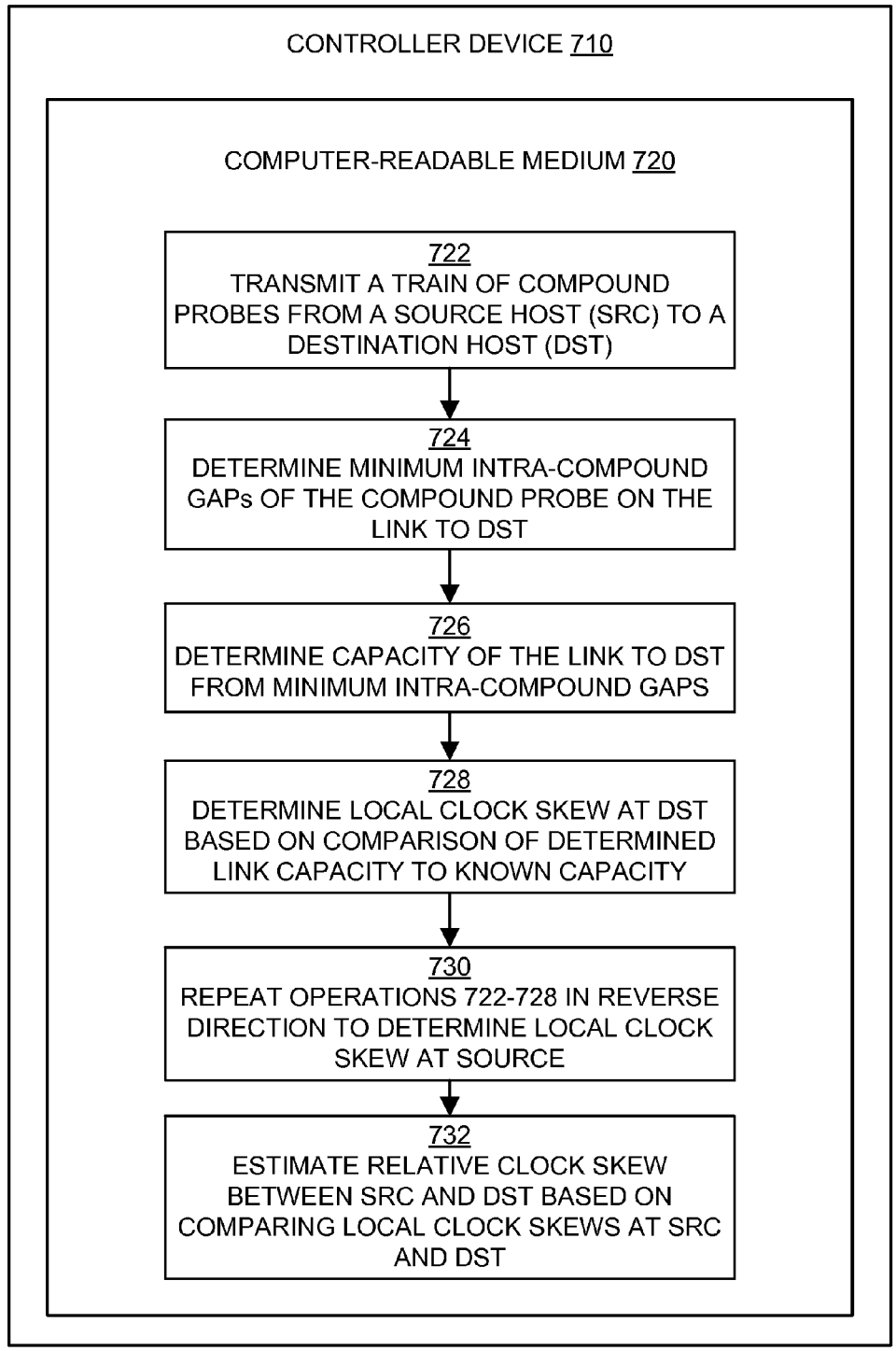
FIG. 7 is a flow diagram illustrating an example method for measuring clock skew between two remote hosts connected through a computer network that may be performed by a computing device such as the device in FIG. 4.

FIG. 7 is a flow diagram illustrating an example method for measuring clock skew between two remote hosts connected through a computer network that may be performed by a computing device such as the device in FIG. 6, arranged in accordance with at least some embodiments described herein.

Thus, controller device 710 may be embodied as computing device 600, or similar devices executing instructions stored in computer-readable medium 720 for performing the method. A process of measuring clock skew between two remote hosts connected through a computer network may include one or more operations, functions or actions as is illustrated by one or more of blocks 722, 724, 726, and/or 728.

Some example processes may begin with operation 722, "TRANSMIT A TRAIN OF COMPOUND PROBES FROM A SOURCE HOST (SRC) TO A DESTINATION HOST (DST)". At operation 722, a train of probe packets may be sent from the source host 442 to the destination host 448 (forward path).

Operation 722 may be followed by operation 724, "DETERMINE MINIMUM INTRA-COMPOUND GAPS OF THE COMPOUND PROBE ON THE LINK TO DST." At operation 724, minimum intra-compound gaps 332 may be computed for the compound probe on the forward path.

Operation 724 may be followed by operation 726, "DETERMINE CAPACITY OF THE LINK TO DST FROM MINIMUM INTRA-COMPOUND GAPS". At operation 726, the capacity of the link on the forward path may be determined from the measured minimum intra-compound gaps.

Operation 726 may be followed by operation 728, "DETERMINE LOCAL CLOCK SKEW AT DST BASED ON COMPARISON OF DETERMINED LINK CAPACITY TO KNOWN CAPACITY". At operation 728, the local clock skew may be computed from the link capacity on the forward path for the destination host 448.

Operation 728 may be followed by operation 730, "REPEAT OPERATIONS 722-728 IN REVERSE DIRECTION TO DETERMINE LOCAL CLOCK SKEW AT SOURCE". At operation 730, the local clock skew may be computed at the source host 442 by repeating the operations 722 to 726 in the reverse path including transmission compound probes from the destination host 448 to the source host 442.

Operation 730 may be followed by operation 732, "ESTIMATE RELATIVE CLOCK SKEW BETWEEN SRC AND DST BASED ON COMPARING LOCAL CLOCK SKEWS AT SRC AND DST". At operation 732, the relative clock skew may be estimated by comparing the local clock skews at the source and destination hosts.

The operations included in the progress of FIG. 7 described above are for illustration purposes. Measurement of clock skew between two remote hosts connected through a computer network may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 8:
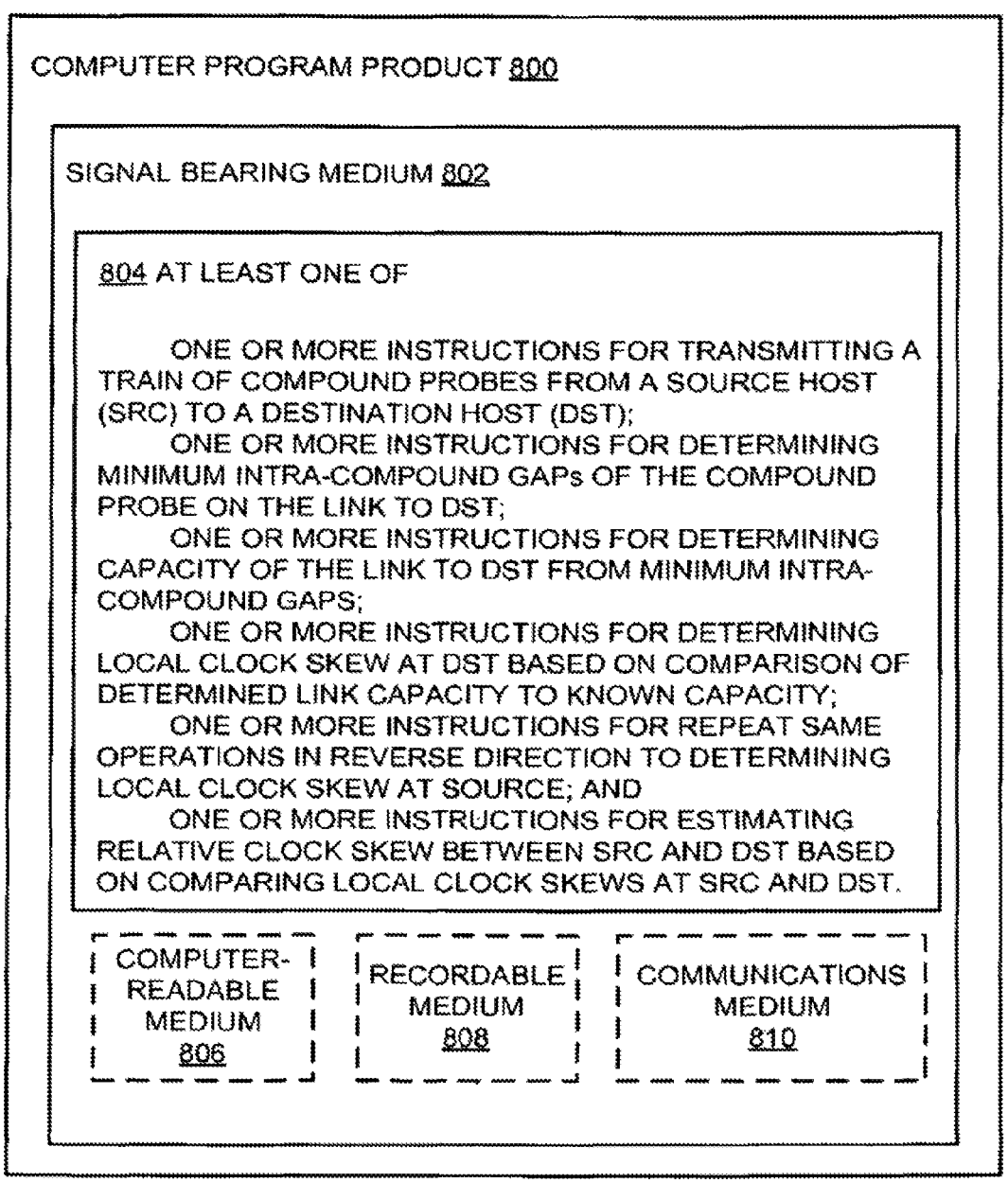
FIG. 8 illustrates a block diagram of an example computer program product for implementing measurement of clock skew between two remote hosts connected through a computer network, all arranged in accordance with at least some embodiments described herein.

FIG. 8 illustrates a block diagram of an example computer program product, arranged in accordance with at least some embodiments described herein.

In some examples, as shown in FIG. 8, computer program product 800 may include a signal bearing medium 802 that may also include machine readable instructions 804 that, when executed by, for example, a processor, may provide the functionality described above with respect to FIG. 2 through FIG. 4. Thus, for example, referring to processor 604, one or more of the tasks shown in FIG. 6 may be undertaken in response to instructions 804 conveyed to the processor 604 by medium 802 to perform actions associated with measuring clock skew between two remote hosts connected through a computer network as described herein. Some of those instructions may include transmitting a train of compound probes from a source host (src) to a destination host (dst); determining minimum intra-compound gaps of the compound probe on the link to dst; determining capacity of the link to dst from minimum intra-compound gaps; determining local clock skew at dst based on comparison of determined link capacity to known capacity; repeating same operations in reverse direction to determining local clock skew at source; and estimating relative clock skew between sic and dst based on comparing local clock skews at src and dst.

In some implementations, signal bearing medium 802 depicted in FIG. 8 may encompass a computer-readable medium 806, such as, but not limited to, a hard disk drive, a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, computer program product 800 may be conveyed to the processor 604 by an RF signal bearing medium 802, where the signal bearing medium 802 is conveyed by a wireless communications medium 810 (e.g., a wireless communications medium conforming with the IEEE 802.11 standard).

According to some examples, a method for estimating a clock skew between two remotely connected hosts is described. An example method may include transmitting a train of compound probes comprising two or more packets from a source host to a destination host, determining a minimum intra-compound gap of the train of compound probes received at the destination host, transmitting another train of compound probes comprising two or more packets from the destination host to the source host, and determining a minimum intra-compound gap of the other train of compound probes received at the source host. The method may further include computing a difference between the minimum intra-compound gaps and estimating the clock skew at the destination host based on a ratio of the computed difference and the minimum intra-compound gap of the other train of compound probes received at the source host.

According to other examples, the method may also include selecting the packets in the train of compound probes of different sizes, selecting the packet sizes such that a packet size of a first packet is larger than a packet size of a second packet in each compound probe, and/or selecting the packets in the other train of compound probes to be substantially same size as the packets in the train of compound probes. The intra-compound gap may be a time gap between an arrival of a last bit of a first packet and an arrival of a last bit of a second packet of the compound probe with the first packet having a larger size than the second packet.

The method may further include selecting the compound probes such that a dispersion gap between the last bit of the first packet and a first bit of the second packet is substantially zero, and upon detecting a compound probe with a non-zero dispersion gap at the destination host, discarding the detected compound probe employing statistical analysis.

According to further examples, the method may further include employing data filtering to eliminate intra-compound gap values from one or more sample sets of measurements at the source host and at the destination host such that smallest intra-compound gaps corresponding to zero dispersion gap are identified for the estimation. The data filtering may include computing a mean of a sample set, discarding elements of the sample set greater than the computed mean resulting in a reduced sample set, computing a standard deviation of the reduced sample set, and iterating through the mean computation and standard deviation computation until one, of following conditions occur: the computed mean of the sample set is equal to a largest element of the reduced sample set, the standard deviation is same in two consecutive iterations, and the standard deviation of an iteration is larger than the standard deviation of a previous iteration. A largest data element may be the smallest intra-compound gap of the sample set upon termination of the data filtering iterations.

According to other examples, a system for estimating a clock skew between two remotely connected hosts may include a first server and a second server. The first server may transmit a train of compound probes comprising two or more packets in a forward path to a second server over the one or more networks, receive a minimum intra-compound gap of the train of compound probes determined at the second server, receive another train of compound probes comprising two or more packets in a reverse path from the second server over the one or more networks, determine a minimum intra-compound gap of the other train of compound probes, compute a difference between the minimum intra-compound gaps, and estimate the clock skew at the second server based on a ratio of the computed difference and the minimum intra-compound gap of the other train of compound probes received at the first server. The second server may transmit the other train of compound probes comprising two or more packets to the first server over the one or more networks.

According to further examples; the first server may further select packet sizes such that a packet size of a first packet in each compound probe of the train of compound probes is a largest packet size allowed of one of the forward and reserves paths and is larger than a packet size of a second packet in each compound probe. The first server may also select the packets in the other train of compound probes to be substantially same size as the packets in the train of compound probes. The intra-compound gap may be a time gap between an arrival of a last bit of a first packet and an arrival of a last bit of a second packet of the compound probe with the first packet having a larger size than the second packet. The first server may further select the compound probes such that a dispersion gap between the last bit of the first packet and a first bit of the second packet is substantially zero, upon detecting a compound probe with a non-zero dispersion gap at the destination host, discard the detected compound probe employing statistical analysis.

According to some examples, the first server may further employ data filtering to eliminate intra-compound gap values from one or more sample sets of measurements at the first server and at the second server such that smallest intra-compound gaps corresponding to zero dispersion gap are identified for the estimation. The first server may employ data filtering based on performing one or more of compute a mean of a sample set, discard elements of the sample set greater than the computed mean resulting in a reduced sample set, compute a standard deviation of the reduced sample set, and iterate through the mean computation and standard deviation computation until one of following conditions occur: the computed mean of the sample set is equal to a largest element of the reduced sample set, the standard deviation is same in two consecutive iterations, and the standard deviation of an iteration is larger than the standard deviation of a previous iteration. A largest data element may be the smallest intra-compound gap of the sample set upon termination of the data filtering iterations. The first server may also repeatedly transmit the train of compound probes and estimate the clock skew under high network congestion conditions. And, the first server may be a network management server.

According to further examples, a computing device for estimating a clock skew between two remotely connected hosts is described, the computing device may include a communication module configured to communicate with a plurality of other computing devices over one or more networks, a memory configured to store instructions, and a processor configured to execute a timing module. The timing module may transmit a train of compound probes comprising two or more packets in a forward, path to a destination host over the one or more networks, receive a minimum intra-compound gap of the train of compound probes determined at the destination host, receive another train of compound probes comprising two or more packets in a reverse path from the destination host over the one or more networks, determine a minimum intra-compound gap of the other train of compound probes, compute a difference between the minimum intra-compound gaps, and estimate the clock skew at the destination host based on a ratio of the computed difference and the minimum intra-compound gap of the other train of compound probes received at the computing device.

According to some examples, the timing module may further select packet sizes such that a packet size of a first packet in each compound probe of the train of compound probes is a largest packet size allowed of one of the forward and reserves paths and is larger than a packet size of a second packet in each compound probe. The timing module may also select the packets in the other train of compound probes to be substantially same size as the packets in the train of compound probes. The intra-compound gap may be a time gap between an arrival of a last bit of a first packet and an arrival of a last bit of a second packet of the compound probe with the first packet having a larger size than the second packet.

According to other examples, the timing module may select the compound probes such that a dispersion gap between the last bit of the first packet and a first bit of the second packet is substantially zero, upon detecting a compound probe with a non-zero dispersion gap at the destination host, discard the detected compound probe employing statistical analysis, and employ data filtering to eliminate intra-compound gap values from one or more sample sets of measurements at the computing device and at the destination host such that smallest intra-compound gaps corresponding to zero dispersion gap are identified for the estimation. For data filtering, the timing module may compute a mean of a sample set, discard elements of the sample set greater than the computed mean resulting in a reduced sample set, compute a standard deviation of the reduced sample set, and iterate through the mean computation and standard deviation computation until one of following conditions occur: the computed mean of the sample set is equal to a largest element of the reduced sample set, the standard deviation is same in two consecutive iterations, and the standard deviation of an iteration is larger than the standard deviation of a previous iteration. A largest data element may be the smallest intra-compound gap of the sample set upon termination of the data filtering iterations. And, the computing device may be a user end device, a work station, or a server.

According to yet other examples, a computer-readable storage medium with instructions stored thereon for estimating a clock skew between two remotely connected hosts is described. The instructions may cause a method to be performed when executed. The method may include transmitting a train of compound probes comprising two or more packets from a source host to a destination host, determining a minimum intra-compound gap of the train of compound probes received at the destination host, transmitting another train of compound probes comprising two or more packets from the destination host to the source host, and determining a minimum intra-compound gap of the other train of compound probes received at the source host. The method may further include computing a difference between the minimum intra-compound gaps and estimating the clock skew at the destination host based on a ratio of the computed difference and the minimum intra-compound gap of the other train of compound probes received at the source host.

According to other examples, the method may also include selecting the packets in the train of compound probes of different sizes, selecting the packet sizes such that a packet size of a first packet is larger than a packet size of a second packet in each compound probe, and/or selecting the packets in the other train of compound probes to be substantially same size as the packets in the train of compound probes. The intra-compound gap may be a time gap between an arrival of a last bit of a first packet and an arrival of a last bit of a second packet of the compound probe with the first packet having a larger size than the second packet. The method may further include selecting the compound probes such that a dispersion gap between the last bit of the first packet and a first bit of the second packet is substantially zero, and upon detecting a compound probe with a non-zero dispersion gap at the destination host, discarding the detected compound probe employing statistical analysis.

According to further examples, the method may further include employing data filtering to eliminate intra-compound gap values from one or more sample sets of measurements at the source host and at the destination host such that smallest intra-compound gaps corresponding to zero dispersion gap are identified for the estimation. The data filtering may include computing a mean of a sample set, discarding elements of the sample set greater than the computed mean resulting in a reduced sample set, computing a standard deviation of the reduced sample set, and iterating through the mean computation and standard deviation computation until one of following conditions occur: the computed mean of the sample set is equal to a largest element of the reduced sample set, the standard deviation is same in two consecutive iterations, and the standard deviation of an iteration is larger than the standard deviation of a previous iteration. A largest data element may be the smallest intra-compound gap of the sample set upon termination of the data filtering iterations.

According to some examples, a method for estimating a clock skew between two remotely connected hosts may include transmitting a train of compound probes comprising two or more packets from a source host to a destination host, receiving a minimum intra-compound gap of the train of compound probes determined at the destination host, receiving another train of compound probes comprising two or more packets from the destination host, determining a minimum intra-compound gap of the other train of compound probes, computing a difference between the minimum intra-compound gaps, and estimating the clock skew at the destination host based on a ratio of the computed difference and the minimum intra-compound gap of the other train of compound probes received at the source host.

According to other examples, the method may also include selecting the packets in the train of compound probes of different sizes, selecting the packet sizes such that a packet size of a first packet is larger than a packet size of a second packet in each compound probe, and selecting the packets in the other train of compound probes to be substantially same size as the packets in the train of compound probes. The intra-compound gap may be a time gap between an arrival of a last bit of a first packet and an arrival of a last bit of a second packet of the compound probe with the first packet having a larger size than the second packet. The method may also include selecting the compound probes such that a dispersion gap between the last bit of the first packet and a first bit of the second packet is substantially zero, and upon detecting a compound probe with a non-zero dispersion gap at the destination host, discarding the detected compound probe employing statistical analysis.

According to further examples, the method may also include employing data filtering to eliminate intra-compound gap values from one or more sample sets of measurements at the source host and at the destination host such that smallest intra-compound gaps corresponding to zero dispersion gap are identified for the estimation. The data filtering may include computing a mean of a sample set, discarding elements of the sample set greater than the computed mean resulting in a reduced sample set, computing a standard deviation of the reduced sample set, and iterating through the mean computation and standard deviation computation until one of following conditions occur: the computed mean of the sample set is equal to a largest element of the reduced sample set, the standard deviation is same in two consecutive iterations, and the standard deviation of an iteration is larger than the standard deviation of a previous iteration. A largest data element may be the smallest intra-compound gap of the sample set upon termination of the data filtering iterations.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to estimate a clock skew between a source host and a destination host, the method comprising:
    selecting different sizes for two or more packets in a first set of compound probes such that a first packet size of a first packet of the two or more packets in the first set of compound probes is larger than a second packet size of a second packet of two or more packets in a second set of compound probes;
    transmitting, from the source host over a link to the destination host, the first set of compound probes that include the two or more packets;
    determining a first minimum intra-compound gap associated with the first set of compound probes received at the destination host;
    transmitting, from the destination host over the link to the source host, the second set of compound probes that include the two or more packets;

determining a second minimum intra-compound gap associated with the second set of compound probes received at the source host;

identifying a difference between the first minimum intra-compound gap and the second minimum intra-compound gap; and employing data filtering iterations on a sample set of measurements that are obtained at the source host and on another sample set of measurements that are obtained at the destination host so as to eliminate the difference between the first minimum intra-compound gap and the second minimum intra-compound gap, such that a smallest intra-compound gap is identified to estimate the clock skew between the source host and the destination host.

2. The method according to claim 1,
wherein the first minimum intra-compound gap includes a time gap between an arrival of a last bit of the first packet of the two or more packets in the first set of compound probes and an arrival of a last bit of a second packet of the two or more packets in the first set of compound probes, and wherein the second minimum intra-compound gap includes another time gap between an arrival of a last bit of a first packet of the two or more packets in the second set of compound probes and an arrival of a last bit of the second packet of the two or more packets in the second set of compound probes.

3. The method according to claim 2, further comprising:
selecting one of the compound probes in the first set of compound probes such that a dispersion gap between the last bit of the first packet of the two or more packets in the first set of compound probes and a first bit of the second packet of the two or more packets in the second set of compound probes is substantially zero.

4. The method according to claim 1, wherein the data filtering iterations are employed by:
computing: a mean of the sample set:
discarding elements of the sample set that are greater than the computed mean so as to result in a reduced sample set;
computing a standard deviation of the reduced sample set; and
iterating through the computed mean and the standard deviation until one of: the computed mean of the sample set is equal to a largest element of the reduced sample set, the standard deviation is same in two consecutive iterations, or a standard deviation of an iteration is larger than a standard deviation of a previous iteration.

5. A system to estimate a clock skew between two remote hosts, the system comprising:
a first server; and
a second server;
wherein the first server is configured to:
select different sizes for two or more packets in a first set of compound probes such that a first packet size of a first packet of the two or more packets in the first set of compound probes is larger than a second packet size of a second packet of two or more packets in a second set of compound probes;
transmit, in a forward path over a network to the second server, the first set of compound probes that include the two or more packets;
receive a first minimum intra-compound gap of the first set of compound probes determined at the second server;

receive, in a reverse path over the network from the second server, the second set of compound probes that include the two or more packets;
determine a second minimum intra-compound gap of the second set of compound probes;
identify a difference between the first minimum intra-compound gap and the second minimum intra-compound gap;
determine a capacity of the network that corresponds to the difference between the first minimum intra-compound gap and the second minimum intra-compound gap; and
employ data filtering iterations on a sample set of measurements that are obtained at the first server and on another sample set of measurements that are obtained at the second server so as to eliminate the difference between the first minimum intra-compound gap and the second minimum intra-compound gap, such that a smallest intra-compound gap is identified to estimate the clock skew between the first server and the second server; and
wherein the second server is configured to:
transmit, to the first server over the network, the second set of compound probes that include the two or more packets.

6. The system according to claim 5,
wherein the first minimum intra-compound gap includes a time gap between an arrival of a last bit of the first packet of the two or more packets in the first set of compound probes and an arrival of a last bit of a second packet of the two or more packets in the first set of compound probes, and wherein the second minimum intra-compound gap includes another time gap between an arrival of a last bit of a first packet of the two or more packets in the second set of compound probes and an arrival of a last bit of the second packet of the two or more packets in the second set of compound probes.

7. The system according to claim 5, wherein the first server is further configured to:
after detection of a compound probe of the first set of compound probes with a non-zero dispersion gap that occurs at the second server, discard the compound probe by employment of statistical analysis.

8. The system according to claim 5, wherein the first server is further configured to:
compute a mean of a sample set,
discard elements of the sample set that are greater than the computed mean so as to result in a reduced sample set;
compute a standard deviation of the reduced sample set; and
iterate through the computed mean and the standard deviation until one of: the computed mean of the sample set is equal to a largest data element of the reduced sample set, the standard deviation is same in two consecutive iterations, or a standard deviation of an iteration is larger than a standard deviation of a previous iteration.

9. The system according to claim 8, wherein the largest data element is associated with the smallest intra-compound gap of the sample set after termination of the data filtering iterations.

10. The system according to claim 5, wherein the first server is further configured to:
repeatedly transmit the first set of compound probes and estimate the clock skew under high network congestion conditions.

11. The system according to claim 5, wherein the first server includes a network management server.

12. A computing device to estimate a clock skew between two remote hosts, the computing device comprising:

a communication module configured to communicate with another computing device over a network, wherein the communication module is configured to:

select different sizes for two or more packets in a first set of compound probes such that a first packet size of a first packet of the two or more packets in the first set of compound probes is larger than a second packet size of a second packet of two or more packets in a second set of compound probes;

transmit, in a forward path over the network to the other computing device, the first set of compound probes that include the two or more packets;

receive a first minimum intra-compound gap of the first set of compound probes determined at a server associated with the other computing device;

receive, in a reverse path over the network from the other computing device, the second set of compound probes that include the two or more packets;

determine a second minimum intra-compound gap of the second set of compound probes;

identify a difference between the first minimum intra-compound gap and the second minimum intra-compound gap; and determine a capacity of the network that corresponds to the difference between the first minimum intra-compound gap and the second minimum intra-compound gap; and employ data filtering iterations on a sample set of measurements that are obtained at the computing device and on another sample set of measurements that are obtained at another computing device so as to eliminate the difference between the first minimum intra-compound gap and the second minimum intra-compound gap, such that a smallest intra-compound gap is identified to estimate the clock skew between the computing device and the other computing device; and a processor coupled to the communication module and configured to execute a timing module, wherein the timing module is configured to:

estimate the clock skew, which occurs at the server associated with the other computing device, based on the smallest intra-compound gap.

13. The computing device according to claim 12, wherein the communication module is further configured to:

select one of the compound probes in the first set of compound probes such that a dispersion gap between a last bit of the first packet of the two or more packets in the first set of compound probes and a first bit of the second packet of the two or more packets in the second set of compound probes is substantially zero.

14. The computing device according to claim 13, wherein the communication module is further configured to:

after detection of a compound probe of the first set of compound probes with a non-zero dispersion gap that occurs at the other computing device, discard the compound probe by employment of statistical analysis.

15. The computing device according to claim 12, wherein the timing module is further configured to:

compute a mean of the sample set;

discard elements of the sample set that are greater than the computed mean so as to result in a reduced sample set;

compute a standard deviation of the reduced sample set; and iterate through the computed mean and the standard deviation until one of: the computed mean of the sample set is equal to a largest data dement of the reduced sample set, the standard deviation is same in two consecutive iterations, or a standard deviation of an iteration is larger than a standard deviation of a previous iteration.

16. The computing device according to claim 15, wherein the largest data element is associated with the smallest intra-compound gap of the sample set after termination of the data filtering iterations.

17. The computing device according to claim 12, wherein the computing device includes one of a user end device, a work station, and a server, and wherein the other computing device includes one of another user end device, another work station, and another server.

* * * * *

UNITED STATES PATENT AND TRADEMARK OFFICE
CERTIFICATE OF CORRECTION

PATENT NO.      : 9,501,093 B2
APPLICATION NO. : 13/981080
DATED           : November 22, 2016
INVENTOR(S)     : Rojas-Cessa et al.

It is certified that error appears in the above-identified patent and that said Letters Patent is hereby corrected as shown below:

In the Specification

In Column 1, Line 10, delete "§371" and insert -- § 371 --, therefor.

In Column 1, Line 12, delete "§119(e)" and insert -- § 119(e) --, therefor.

In Column 1, Line 14, delete "PCT. Application and the U.S. Provisional Application" and insert -- PCT Application and the U.S. Provisional Patent Application --, therefor.

In Column 4, Line 3, delete "inter alis," and insert -- inter alia, --, therefor.

In Column 6, Lines 40-41, delete "$\beta_{dst}=((m'_n \times s_b)–E[G(s_b])/E[G(s_b)]$" and insert -- $\beta_{dst}=((m'_n \times s_b)–E[G(s_b)])/E[G(s_b)]$ --, therefor.

In Column 6, Line 50, delete "$E[G(s_y)]=Ss_y/L_1$" and insert -- $E[G(s_y)]=s_y/L_1$ --, therefor.

In Column 6, Line 67, delete "erroneous'" and insert -- erroneous --, therefor.

In Column 7, Line 54, delete "bidirectional" and insert -- bi-directional --, therefor.

In Column 9, Line 28, delete "a, modulated" and insert -- a modulated --, therefor.

In Column 10, Line 51, delete "progress" and insert -- process --, therefor.

In Column 12, Line 18, delete "until one, of" and insert -- until one of --, therefor.

In Column 12, Line 45, delete "examples; the" and insert -- examples, the --, therefor.

In Column 15, Line 60, delete "hardwire" and insert -- hardware --, therefor.

Signed and Sealed this
Twenty-eighth Day of March, 2017

Michelle K. Lee
*Director of the United States Patent and Trademark Office*

CERTIFICATE OF CORRECTION (continued)
U.S. Pat. No. 9,501,093 B2

In the Claims

In Column 19, Line 38, in Claim 4, delete "computing: a" and insert -- computing a --, therefor.

In Column 20, Line 47, in Claim 8, delete "sample set," and insert -- sample set; --, therefor.